United States Patent [19]

Harper et al.

[11] Patent Number: 5,206,295
[45] Date of Patent: Apr. 27, 1993

[54] COATING COMPOSITION COMPRISING AN ANHYDRIDE-CONTAINING POLYMER AND A STRUCTURED EPOXY-CONTAINING POLYMER

[75] Inventors: Lee R. Harper, Media; Gayann S. McDonnell, Lafayette Hill, both of Pa.

[73] Assignee: E. I. Du Pont de Nemours and Company, Wilmington, Del.

[21] Appl. No.: 660,087

[22] Filed: Feb. 25, 1991

[51] Int. Cl.$^5$ .............................................. C08L 35/00
[52] U.S. Cl. ...................................... 525/207; 525/117; 525/208; 526/194
[58] Field of Search .................. 525/117, 207, 208; 526/194

[56] References Cited

U.S. PATENT DOCUMENTS

| | | | |
|---|---|---|---|
| 4,414,372 | 11/1983 | Farnham et al. | 526/194 |
| 4,508,880 | 4/1985 | Webster | 526/194 |
| 4,681,918 | 7/1987 | Webster | 525/285 |
| 4,711,942 | 12/1987 | Webster | 526/185 |
| 4,783,500 | 11/1988 | Webster | 525/355 |
| 4,816,500 | 3/1989 | Corcoran | 523/400 |
| 4,847,328 | 7/1989 | Hutchins et al. | 525/117 |
| 4,851,477 | 7/1989 | Hutchins et al. | 525/117 |
| 4,906,677 | 3/1990 | Barsotti et al. | 523/400 |
| 4,940,761 | 7/1990 | Spinelli et al. | 525/195 |
| 4,975,474 | 12/1990 | Barsotti et al. | 523/400 |

FOREIGN PATENT DOCUMENTS 0123793 11/1984 European Pat. Off. .
0248596 12/1987 European Pat. Off. .

*Primary Examiner*—John C. Bleutge
*Assistant Examiner*—D. E. Aylward
*Attorney, Agent, or Firm*—Chris P. Konkol

[57] ABSTRACT

A coating composition, useful for finishing automobiles and trucks, in which the film forming binder contains, as reactive binder components, a mixture of a first polymer having at least two reactive anhydride groups and a second polymer or oligomer having at least two reactive epoxy groups, characterized by the second polymer being structured so that the epoxy groups are skewed to have a majority thereof at one end of the polymer.

17 Claims, No Drawings

COATING COMPOSITION COMPRISING AN ANHYDRIDE-CONTAINING POLYMER AND A STRUCTURED EPOXY-CONTAINING POLYMER

BACKGROUND OF THE INVENTION

This invention is related to a coating composition comprising an anhydride-containing polymer and an epoxy-containing polymer, which polymers are co-reactive and capable of forming a cured coating on a variety of substrates. More particularly, this invention is directed to a multicomponent composition in which the epoxy-containing polymer component is structured for improved properties.

There are a variety of epoxy/anhydride multicomponent coating compositions available for coating or finishing substrates. Typically, the components of such compositions are mixed together before application and then the resulting composition is applied by conventional techniques such as spraying. The composition is then cured, either at ambient or elevated temperatures. These compositions may be used as a finish for original equipment, particularly automobiles and trucks, or as a refinish for the same. Such compositions may also be used to paint bridges, buildings, appliances, metal cabinets and other assorted structures.

Representative compositions are disclosed in the following patents:

U.S. Pat. No. 4,507,411 discloses a two component composition comprising a glycidyl or epoxy-containing component which, in the presence of an amine, alcohol, ketimine, acetal or oxazolidine, cures at ambient temperatures.

European Patent Application 0,123,793 discloses a two component composition comprising a first component, which has an anhydride ring opened with an amine, and a second component, which contains glycidyl groups.

U.S. Pat. No. 3,136,736 and British patent 994,881 disclose coating compositions comprising polyepoxides and maleic anhydride copolymers.

U.S. Pat. No. 4,732,791 discloses a coating composition comprising polyepoxides, a monomeric anhydride curing agent and a low number average molecular weight hydroxyl group containing polyfunctional material.

Although anhydride-epoxy compositions are generally known, there is a need for a coating composition with improved properties. In general, coating compositions, in order to be useful as an exterior finish or refinish for a variety of substrates including automobiles and trucks, should have excellent adhesion to the substrate to which it is applied, good outdoor weatherability, and excellent appearance.

Furthermore, because of environmental concerns about volatile organic components (VOC's) there is a need for a coating composition with a high solids and low volatile organic content which retains its sprayability. In addition, such a coating composition should exhibit an excellent mix of other desirable coating composition qualities such as pot life, viscosity, compatibility with the basecoat, and rate of curing. The cured coating must also have hardness and durability.

SUMMARY OF THE INVENTION

The present invention is directed to a coating composition comprising, in an organic carrier, reactive binder components comprising:
(a) a polymer comprising at least two anhydride functional groups and having a weight average molecular weight of about 2,000–50,000;
(b) a polymer or oligomer comprising at least two reactive epoxy functional groups; and
(c) about 0.1–5% by weight, based on the weight of the binder, of a catalyst;
wherein the epoxy functional polymer or oligomer is structured, by means of group transfer polymerization, so that a first block is richer in epoxy groups than a second block thereof.

DETAILED DESCRIPTION OF THE INVENTION

As indicated above, the present invention is directed to an coating composition comprised of a mixture of a polymeric anhydride and a polymeric or oligomeric epoxide, which is reacted or cured by means of a catalyst. This coating composition is useful in clearcoat and single stage enamels, for application to either refinish or original equipment manufacture. The composition can also be used over plastic substrates used in automobiles and trucks such as filler panels, side panels, fender extensions, moldings and other trim parts.

The present coating composition differs from prior art coatings in utilizing an architecturally controlled epoxide resin made by a group transfer polymerization technique. The composition so produced provides lower viscosity during application, a faster cure, and improved hydrolytic and outdoor durability. In addition, particular embodiments of the present invention enable the molecular structure of the epoxide resin to be controlled to give compatible clear films with combinations of monomers which are desirable but which are otherwise incompatible in random polymers.

The film forming binder of the coating composition contains components that are mixed together before application. The film forming binder content of the composition is typically about 20–80% by weight of an organic carrier or solvent for the binder.

The composition is capable of forming an excellent clear coating over colored pigmented finishes. The coating has good adhesion to the pigmented finish, has excellent humidity resistance and is weatherable and durable.

The composition also can be pigmented to form a colored finish. These pigmented compositions are useful as exterior coatings for automobiles and trucks, as maintenance coatings for tanks, bridges, or buildings, such as factories and oil refineries, and as industrial coatings for appliances, metal cabinets, shelves and the like.

Preferably, the coating composition has a high solids content and contains about 40–80% by weight binder and 20–60% by weight of organic solvent. The binder of the composition typically contains about 25–90% by weight of an anhydride functional polymer, containing at least two anhydride groups, and 5–50% by weight of an epoxy functional component. Additional components may be included, for example as described in commonly assigned applications U.S. patent application Ser. Nos. 212,052; 212,053; 212,054; and 538,528, hereby incorporated by reference.

The anhydride functional polymer has a weight average molecular weight of about 2,000-50,000, as determined by gel permeation chromatography using polymethyl methacrylate as a standard. Preferably, the anhydride functional polymer has a weight average molecular weight of about 3,000-25,000.

The anhydride functional polymer is prepared by conventional techniques in which the monomers, solvent, and conventional catalysts such as t-butyl perbenzoate or t-butyl peracetate are charged into a polymerization vessel and heated to about 75°-200° C. for about 0.5-6 hours to form the polymer.

A preferred anhydride functional polymer is an acrylic polymer. Such an anhydride acrylic polymer may be formed, for example, by polymerizing monomers of alkyl methacrylates, alkyl acrylates or mixtures thereof, where the alkyl groups have 1-12 carbon atoms, and monomers of ethylenically unsaturated anhydrides (or ethylenically unsaturated dicarboxylic acids which are converted to the acid anhydride during the polymerization). Optionally, the anhydride acrylic polymer may contain other components such as styrene, methyl styrene, acrylonitrile, methacrylonitrile in amounts of about 0.1-50% by weight, in order to obtain the desired properties, such as hardness or flexiblity, for a particular application.

Typical alkyl acrylates and methacrylates that may be used to form an anhydride acrylic polymer are as follows: methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the anhydride acrylic polymer are acrylamide, methacrylamide, or acrylo alkoxy silanes such as gamma methacryloyl propyl trimethoxy silane. Also, the anhydride acrylic polymer may contain about 0.1-5% by weight of an ethylenically unsaturated acid such as acrylic acid, methacrylic acid, itaconic acid, maleic acid and the like.

Typically useful anhydrides may comprise: itaconic anhydride, maleic anhydride, and isobutenyl succinic anhydride. In addition to the anhydride polymer, diluents containing anhydride functionalites may be included in the composition to moderate the properties, for example, to lower the viscosity or moderate the reactivity. Such diluents may include tetrahydrophthalic anhydride, alkylhexahydrophthalic anhydride, succinic anhydride, a hydroxy polyester reacted with a trimellitic anhydride, a glycol reacted with a trimellitic anhydride, an acrylic reacted with an olefin and a maleic or half ester, a mixture of hexahydrophthalic and azelaic anhydride, and the like.

As indicated above, it is possible to impart the anhydride functionality to a polymer by using the appropriate ethylenically unsaturated dicarboxylic acid which converts to the corresponding acid anhydride by simple heating. For example, ethylenically unsaturated dicarboxylic acids that can be used are itaconic acid, maleic acid, isobutenyl succinic acid and the like.

Preferred anhydride acrylic polymers are as follows: a combination of styrene/butyl methacrylate/butylacrylate/itaconic anhydride, a combination of methyl methacrylate/butyl acrylate/itaconic anhydride, butyl acrylate/styrene/maleic anhydride/maleic acid, or a combination of methyl methacrylate/butyl acrylate/itaconic anhydride.

The epoxy component contains at least two glycidyl groups and can be an oligomer or a polymer. The epoxy component is a combination of 10 to 90% epoxy functional monomers and 10 to 90% non-epoxy functional monomers, i.e. in a ratio of 9:1 to 1:9. Preferably the percent of epoxy functional monomers is about 50% or a ratio of about 1:1. The epoxy functional monomers which may be polymerized include alkyl esters of epoxy functional methacrylate monomers. A preferred monomer is glycidyl methacrylate. Others include epoxy cyclohexyl methacrylate or similar epoxy containing methacrylates.

Non-epoxy functional monomers which may be used to form the epoxy polymer preferably are branched alkyl methacrylates such as isobutyl methacrylate, 2-ethylhexyl methacrylate and tertiary butyl methacrylate. The epoxy polymers may optionally also include silane functional monomers.

Particularly preferred epoxy acrylic polymers are formed from a combination of monomers comprising isobutyl methacrylate and glycidyl methacrylate.

In addition to the epoxy component of the claimed composition, adjunct glycidyl containing monomers or oligomers can be used, for example, sorbitol polyglycidyl ether, mannitol polyglycidyl ether, pentaerythritol polyglycidyl ether, glycerol polyglycidyl ether, low molecular weight epoxy resins such as epoxy resins of epichlorohydrin and bisphenol A, di- and polyglycidyl esters of acids, polyglycidyl ethers of isocyanurates, such as "Denecol" EX301 from Nagase. Sorbitol polyglycidyl ether, such as Araldite XUGY-358 ® from Ciba-Geigy, and di- and polyglycidyl esters of acids, such as Araldite CY-184 ® from Ciba-Geigy, are preferred since they form high quality finishes.

As indicated above, the epoxy polymer or oligomer is structured so that there is a greater concentration of epoxy fuctional groups (or polymerized monomers having such groups) at one end of the polymer, typically the end which is first synthesized. Such polymers are referred to as "structured" because they differ from an ordinary random copolymer. There are various kinds of structured polymers, for example, clustered, blocked, and bias clustered or skewed. The epoxy functional polymers of the present invention can be classified as structured polymers of the skewed kind. The first part of the polymer is richer in epoxy groups, but not exclusive in other monomers not having epoxy groups.

The structured polymers are suitably prepared by a group transfer process, in which the polymer starts out by means of a silane-acrylic derivative or other such initiator which adds one monomer at a time to the polymer chain and transfers its initiator group. Catalysts for polymerization of the epoxy polymers may include tetrabutyl ammonium chlorobenzoate, tetrabutylammonium bifluoride, and tris(dimethylamino)sulfonium bifluoride. The initiator may be killed after a desired amount of polymerization by hydrolyzing off the silane. A suitable method of preparing these polymers by a group transfer process is generally disclosed in U.S. Pat. Nos. 4,417,034; 4,414,372; and European Patent Application Publication 0 248 596, hereby incorporated by reference. Preferably, the polymer or oligomer so produced has a weight average molecular weight of about 2000-10,000, preferably 2500-3500, such that the polymer has a desirably low transition glass temperature, low viscosity, and good solubility.

The composition according to the present invention is advantageous with respect to the balance of speed of cure and viscosity. It has been found that a faster cure can be coupled with a lower viscosity with the present composition, employing a structurally skewed epoxy functional polymer, than with a random structure. Another significant advantage of the present composition is that improved compatability with respect to the basecoat may be obtained, compared to the use of random polymers. Incompatibility can cause hazy films due to unmatched solubility parameters and refractive indices.

Typical solvents used to prepare the anhydride functional polymer and used as a diluent for the coating composition are as follows: toluene, xylene, butyl acetate, ethyl benzene, higher boiling aromatic hydrocarbons, amyl acetate, ethyl acetate, propyl acetate, ethylene or propylene glycol mono alkyl ether acetates.

In addition to the solvents listed above, certain alcoholic solvents are also useful. Examples of such alcohols are propanol, isobutanol, methanol, isopropanol, tertiary butanol, n-butanol, propylene glycol monomethyl ether, ethylene glycol monobutyl ether, and other alcoholic solvents. The alcoholic solvents, under certain use conditions, convert portions of the anhydride to a half ester also useful as reactants in this system. Consequences of this effect may have to be considered in formulation.

About 0.1-5% by weight, based on the weight of the binder of the coating composition, of a catalyst is added to enhance curing of the composition. Catalysts, which may be conventional, include pyridinium salts, stannous chlorides, aluminum or titanium compounds or chelates, lithium or alkaline earth salts or salts of acrylic or polyester carboxylates, amines or quaternary ammonium salts, phosphonium salts, imidazoles such as 1-n-propyl-3-methylimidazole-2-thione, or dialkylamino substituted aromatics or benzyl dialkyl amines. Typical catalysts are as follows: triethylene diamine (1,4-diazabicyclo[2.2.2.]octane or DABCO), quinuclidine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)phenol, bis(dimethylamino)-propan-2-ol, N,N,N$^1$,N$^1$-tetramethylethylenediamine, N,methyldiethanolamine, N,N-dimethyl-1,3-propanediamine and 1-dimethylamino-2-propanol or quaternary ammonium salts such as tert-butyl ammonium bromide, benzyl trimethyl ammonium formate and the like. In addition, the catalyst can be incorporated in the polymeric chain by using amino functional alkyl acrylates such as 2-diethyl amino ethyl methacrylate, vinyl pyridine, tert-butyl amino ethyl methacrylate and the like.

The catalyst need not be added to the coating composition. After an article is coated, the article may be passed into a chamber containing catalyst vapors. Dimethylethanol amine is a catalyst that can be vaporized and used to cure the composition. Also, to achieve curing, the catalyst can be sprayed with the coating composition using a dual spray gun.

Generally, the composition is applied by conventional techniques such as spraying and electrostatic spraying. The resulting coating can be dried and cured at ambient temperatures or can be cured at elevated temperatures of 60° to 200° C. At ambient temperatures, the coating dries to a tack free condition in about 180 minutes and in about 24 hours the coating is substantially cured. In about 5-7 days, the coating is completely cured. Coatings are applied to form a finish about 0.5-5 mils thick, and preferably 1-2 mils thick.

The finish has excellent gloss, good adhesion to substrate, excellent weatherability, and high solids.

To improve weatherability of the clear finish of the coating composition, about 0.1-5%, by weight, based on the weight of the binder, of one or more ultraviolet (UV) light absorbers and 0.1-5% by weight of one or more hindered amine light stabilizers can be added. UV light stabilizers absorb without degradation, while hindered amine light stabilizers are free radical traps. Also, about 0.1-5% by weight, based on the weight of the binder, of an antioxidant can be added.

Generally, when the coating composition of this invention is used as a clear coating, it is applied by conventional spraying techniques, to a color or base coat of an automobile or truck, preferably, electrostatic spraying is used. Other possible application techniques include airless spray, high volume low pressure spray, air assisted airless, brush rolling, and pad applicators. The coatings are baked at about 60° to 140° C. for about 10 to 40 minutes. In refinishing automobiles and trucks, the clear coating is applied to a color coat and then can be dried at ambient temperatures or baked to form a clear finish. The resulting clear coat or finish is about 1-5 mils thick, preferably 1-2 mils thick, and has excellent gloss, good adhesion to the color coat and excellent weatherability.

The composition can be pigmented to form a colored finish or primer. About 0.1-200% by weight, based on the weight of the binder, of conventional pigments can be added using conventional techniques in which a mill base containing pigment, dispersant and solvent is first formed. The mill base is then mixed with the composition to form a colored composition. This composition can be applied and cured as shown above.

The following examples illustrate the invention. All parts, percentages, and ratios are on a weight basis unless indicated otherwise. Molecular weights are determined by gel permeation chromatography using polymethyl methacrylate as the standard.

EXAMPLE 1

This example illustrates the preparation of an anhydride acrylic polymer for use in the present composition. The following constituents were charged into a reactor with a thermometer, stirrer, dropping funnel, nitrogen induction tube and condenser:

|  | Parts by Weight |
|---|---|
| Portion 1 | |
| Xylene | 182.4 |
| Butyl acetate | 20.2 |
| Portion 2 | |
| Methylmethacrylate monomer | 96.0 |
| Butylacrylate monomer | 293.4 |
| Xylene | 10.0 |
| Portion 3 | |
| Itaconic Acid | 167.2 |
| Xylene | 59.8 |
| Portion 4 | |
| T-Butylperacetate | 26.7 |
| Butyl acetate | 10.6 |
| Xylene | 6.7 |
| Total | 973.0 |

Portion 1 was charged to the reactor, covered with a nitrogen blanket and heated to its reflux temperature (approximately 135° C.). Portion 2 is added dropwise over a 180 minute period. Portion 3 is added simultaneously with portions 2 and 4 over a 180 minute period as five minute increment shots of solid itaconic acid followed with washings of xylene. Portion 4 was premixed and added dropwise simultaneously with portions 2 and 3 over a 200 minute period. The resulting composition is then held at reflux until 22 pounds of water per 100 gallon batch size are removed.

The resulting polymer composition had a weight solids content of 64–66% and the polymer had a Gardner-Holdt viscosity of X-Z2. The polymer had a weight average molecular weight of 3500.

EXAMPLE 2

This example illustrates the preparation of an epoxide polymer by a group transfer polymerization. Synthesis of a skewed structure epoxy polymer by group transfer polymerization may be accomplished by means of the following mixture of ingredients: trimethyl silane protected hydroxy ethyl methacrylate/isobutyl methacrylate/glycidyl methacrylate in a mole ratio of 1/8/8.

The following components, comprising an organic solvent, a group transfer initiator, and the polymer monomers, are charged into a polymerization reactor:

| Components | Parts |
| --- | --- |
| Tetrahydrofuran | 469.304 |
| 1- (2-trimethylsiloxy) ethoxy-1-trimethylsiloxy-2-methyl propene | 36.080 |
| Glycidyl methacrylate monomer | 112.44 |
| Iso-butyl methacrylate monomer | 37.100 |

The above ingredients are dried over molecular sieves and charged to a clean, dry reactor. The solution was cooled to −5° C. The cooling is stopped for the start of the exothermic polymerization reaction, and the following solution, comprising a polymerization catalyst and additional solvent, are added together:

| Component | Parts |
| --- | --- |
| tetrabutyl ammonium chlorobenzoate | 0.286 |
| tetrahydrofuran | 0.571 |

The solution is added over 30 minutes, stopping when the reaction begins to exotherm. Cooling is resumed when the exotherm raises the temperature to 10°–15° C. When 75% of the charged monomer is converted, proceed to next step, involving the addition of the following two solutions:

| Component | Parts |
| --- | --- |
| Solution 1: | |
| Tetrahydrofuran | 2.143 |
| tetrabutyl ammonium chlorobenzoate | 0.286 |
| Solution 2: | |
| Glycidyl methacrylate | 37.100 |
| Iso-butyl methacrylate | 112.440 |

Both solutions are added simultaneously, solution 1 over 40 minutes and solution 2 over 30 minutes. Once complete conversion of the monomers has occurred, the following components are added in the order listed:

| Component | Parts |
| --- | --- |
| Methanol | 8.250 |
| Glacial acetic acid | 4.000 |

The resulting intermediate polymer solution has at a solids content of 40.08%. The following solution is prepared:

| Component | Parts |
| --- | --- |
| Above intermediate | 800.00 |
| butyl acetate | 144.11 |
| glacial acetic acid | 4.10 |

This solution is distilled out to obtain 453.5 parts for a resulting solution of 65% solids.

EXAMPLE 3

This example illustrates the synthesis of a skewed structure epoxy polymer, of lower molecular weight than the previous example, by means of reacting the following components: trimethyl silane protected hydroxy ethyl methacrylate/isobutylmethacrylate/glycidyl methacrylate mole ratio of 1/5/5.

The following ingredients were dried over molecular sieves and then charged to a clean, dry reactor:

| Component | Parts |
| --- | --- |
| Tetrahydrofuran (anhydrous) | 714.428 |
| 1-(2-trimethylsiloxy) ethoxy-1-trimethylsiloxy-2-methyl propene | 80.143 |
| glycidyl methacrylate monomer | 154.143 |
| iso-butyl methacrylate | 51.285 |

The solution is cooled to −5° C. For the start of the exothermic polymerization reaction, the cooling is stopped and the following solution is added over 30 minutes, stopping when the reaction temperature reaches 10°–15° C.:

| Component | Parts |
| --- | --- |
| tetrabutyl ammonium chlorobenzoate | 0.286 |
| tetrahydrofuran | 0.571 |

When charged monomer is 75% converted, proceed to next step, involving the addition of the following two solutions:

| Component | Parts |
| --- | --- |
| Solution 1: | |
| Tetrahydrofuran | 2.143 |
| tetrabutyl ammonium chlorobenzoate | 0.286 |
| Solution 2: | |
| Glycidyl methacrylate | 51.286 |
| Iso-butyl methacrylate | 154.143 |

Both solutions are added simultaneously. Solution 1 is added over 40 minutes and solution 2 is added over 30 minutes. Once complete conversion of the monomers has occurred, the following components are added in the order listed:

| Component | Parts |
| --- | --- |
| Methanol | 13.714 |

| Component | Parts |
|---|---|
| Glacial acetic acid | 6.143 |

The product is distilled off to remove 428.571 parts of excess solvent. A yield is obtained of 800.0 parts of an intermediate polymer solution at 61% solids. This intermediate is concentrated as follows:

| Component | Parts |
|---|---|
| Above intermediate | 800 |
| butyl acetate | 189.8 |
| glacial acetic acid | 4.25 |

The resulting product is distilled out to remove 313.2 parts, for a resulting solution of 65% solids.

COMPARATIVE EXAMPLE 4

This example illustrates, for comparison to the present invention, the synthesis of a comparison acrylic polymer by free radical polymerization and control of molecular weight by chain transfer techniques. The following components are reacted: isobutyl methacylate/glycidyl methacrylate/hydroxyethyl methacryalate in a ratio of 5/5/1.

A reactor equipped with addition funnels, agitator, nitrogen purge and reflux condenser was charged with the following components:

| Components | Parts |
|---|---|
| Isobutyl methacrylate monomer | 176.75 |
| Glycidyl methacrylate monomer | 176.75 |
| hydroxyethyl methacrylate monomer | 25.34 |
| Toluene | 264.57 |

The mixture was heated to reflux and the following mixture fed to the agitated reactor uniformly over 5 minutes:

| Component | Parts |
|---|---|
| 0.17% Cobalt complex Co(DMG-BF$_2$)$_2$ | 27.08 |
| VAZO 88 | 0.37 |
| Toluene | 15.70 |

VAZO 88 is a free radical initiator which is 1,1'-azobis(methylbutyronitrile). The following mixture was added to the refluxing solution over 4 hours at a uniform rate of addition:

| Component | Parts |
|---|---|
| Toluene | 63.47 |
| Isobutyl methacrylate | 176.75 |
| Hydroxyethyl methacrylate | 25.86 |
| Glycidyl methacrylate | 176.75 |
| VAZO 88 | 1.33 |

When addition is completed, the product is held at reflux (125° C.) and the following mixture is added over 1 hour and held an additional hour at reflux:

| Component | Parts |
|---|---|
| Toluene | 88.29 |

| Component | Parts |
|---|---|
| VAZO 88 initiator | 0.33 |

The final polymer solution had a solids content of 59.39% solids, a number average molecular weight of 1425, and a weight average molecular weight of 2327.

COMPARATIVE EXAMPLE 5

This example illustrates, for comparison to the present invention, the synthesis of a random glycidyl methacrylate copolymer by conventional free radical synthesis, without control of the molecular weight by cobalt chain transfer. Toluene, 258.001 parts by weight, is added to a reactor and heated to reflux (about 230° F.). The following two solutions are added while maintaining reflux at specified rates for each:

| Component | Parts |
|---|---|
| Solution 1: | |
| Glycidyl methacylate | 269.117 |
| Toluene | 8.979 |
| n-Butyl methacrylate | 179.411 |
| Toluene | 5.388 |
| Solution 2: | |
| Toluene | 36.543 |
| VAZO 67 | 13.469 |
| Toluene | 8.082 |

Solution 1 above is fed over 120 minutes and solution 2 is fed over 140 minutes. The resulting reaction mixture is held at reflux for 30 minutes. Xylene, in portions of 41.386 and 26.940, are added. By final adjustment, a product is obtained having a solids content of 52.0%, an epoxide content of 9.55% on total solution, a number average molecular weight of 6600 and a weight average molecular weight of 13360.

EXAMPLE 6

This example illustrates the synthesis of an acrylic polyol by conventional free radical synthesis, which polyol may be employed in a composition according to the present invention. Methyl amyl ketone solvent, in the amount of 141.300 parts by weight, is charged to a reactor and heated to reflux (150° F.). The following two solutions are fed simultaneously, at the specified rates, to the reactor:

| Component | Parts |
|---|---|
| Solution 1: | |
| Styrene | 141.86 |
| Ethyl methacrylate | 141.86 |
| Lauryl methacrylate | 113.51 |
| Hydroxyethyl methacrylate | 170.19 |
| Solution 2: | |
| Methyl amyl ketone | 34.92 |
| Tertiary butyl peracetate | 27.34 |

Solution 1 is fed over a 300 minute period and solution 2 is added over a 315 minute period. The resulting solution is refluxed over 30 minutes and then diluted with 65.02 parts methyl amyl ketone. The product obtained has a solids content of 70.0% and a viscosity of Z-1 on a Gardner-Holdt scale.

EXAMPLE 7

This example illustrates the synthesis of an anhydride polymer for use in a composition according to the present invention. Xylene, in the amount of 200.1 parts, is charged to a reactor equipped with distillation and water separation equipment. The contents are heated to reflux (about 135° C.). The following components are charged to a separate first feed tank:

| Component | Parts |
| --- | --- |
| 50% slurry of itaconic acid in xylene | 369.2 |
| Styrene monomer | 88.4 |
| n-butyl methacrylate monomer | 117.8 |
| n-butyl acrylate monomer | 223.8 |
| xylene | 48.3 |

The following components are charged to a different second feed tank:

| Component | Parts |
| --- | --- |
| t-butyl peracetate initator | 29.4 |
| Xylene | 36.1 |

The contents of the first and second feed tanks are simultaneously fed to the reactor at a constant rate over 3 hours, while maintaining reflux and distilling off water as it separates in the water separator. Then, the the feed lines are rinsed with 43.0 parts xylene into the reactor. The reactor contents are held at reflux until 24.3 parts of water are removed. Using vacuum to maintain reflux at 90° C. (about 23 inches Hg), 402.9 parts xylene are distilled off. Propylene glycol monomethyl ether acetate, in the amount of 165.1 parts, is added over 10 minutes. The product is cooled and stored for use. A solids content of 68% and an anhydride content, equal to 0.0032 equivalents/gram of solution, is obtained.

EXAMPLE 8

This example illustrates the preparation of a multicomponent clearcoat capable of curing at ambient temperature. The following three mixtures are mixed just prior to spray application over a water borne basecoat which provides the color required for an automotive refinish coating:

| Component | Parts |
| --- | --- |
| Anhydride Mixture | |
| Anhydride polymer (prepared in Example 7 above) | 35.87 |
| Methyl hexahydrophthalic anhydride | 8.20 |
| Tinuvin TM 1130 UV absorber (Ciba-Geigy) | 3.47 |
| Tinuvin TM 123 HALS (Ciba-Geigy) | 2.31 |
| Resiflow S (Monsanto) | 0.87 |
| Epoxy Mixture: | |
| Polyepoxide (prepared in Example 2 above) | 79.02 |
| Diglycidyl ester (Ciba-Geigy CY184) | 7.16 |
| Glycidyl ether (Ciba-Geigy DY025) | 6.12 |
| Silane epoxy (Union Carbide A187) | 8.06 |
| Catalyzed Reducer Mixture: | |
| 1,4-Diazabicyclo [2.2.2.]octane (25% in butanol) | 11.57 |
| Methyl ethyl ketone | 25.62 |

-continued

| Component | Parts |
| --- | --- |
| Xylene | 11.73 |
| Total | 200.00 |

The theoretical constants for the above resulting composition are:
Solids=57.67%
VOC=3.50 lbs/gallon
Equivalent ratio (epoxy/anhydride)=1.40
% catalyst (on solids)=2.50%
% UVA (on solids)=3.00%
% HALS (on solids)=2.00%, wherein HALS is hindered amine light stabilizer. The determined properties were:
Solids=57.62%
VOC=3.50 lb/gallon
Viscosity (Zahn #2 )=22.5 seconds
Viscosity (after 2 hours)=76 seconds
Time to tack free=2.50 hours
Hardness (Persoz) after 3 days=56
Hardness (Persoz) after 1 week=67

The appearance of the coating was excellent with high gloss and distinctness of image over the water borne basecoat system. In addition, this system when used over a high quality primer, has excellent humidity adhesion performance which is difficult to attain with conventional finishes.

EXAMPLE 9

This example illustrates a multicomponent clearcoat composition, according to the present invention, with an acid/catalyst complex for moderating the activity of the catalysts. The composition was prepared by mixing the following three mixtures just prior to spray application over a water borne basecoat which provides the color required for an automotive refinish coating.

| Component | Parts |
| --- | --- |
| Ardride Containing Mixture: | |
| Anhydride polymer (as prepared in Example 7) | 34.25 |
| Methyl hexahydrophthalic anhydride | 7.83 |
| Tinuvin TM 1130 UV absorber (Ciba-Geigy) | 3.48 |
| Tinuvin TM 123 HALS (Ciba-Geigy) | 2.32 |
| Resiflow S (Monsanto) | 0.87 |
| 1,4-Diazabicyclo[2.2.2.]octane/ monomethyl ester of methyl hexahydrophthalic acid | 10.87 |

The latter component is prepared by mixing 40 parts of the monomethyl ester of methylhexahydrophthalic acid with 22.4 parts of 1,4-Diazabicyclo[2.2.2.]octane (DABCO) in 20.8 parts of butyl acetate.

| Component | Parts |
| --- | --- |
| Epoxy Containing Mixture: | |
| Polyepoxide (as prepared in Example 2) | 75.43 |
| The following diluents: | |
| Diglycidyl ester (Ciba-Geigy CY184) | 6.83 |
| Glycidyl ether (Ciba-Geigy DY025) | 5.84 |
| Silane epoxy (Union Carbide A187) | 7.69 |
| Reducer Containing Mixture: | |
| Methyl ethyl ketone | 24.46 |
| Xylene | 20.21 |

| Component | Parts |
|---|---|
| -continued | |
| Total | 200.00 |

The theoretical constants for the above composition are as follows:
Solids = 58.05%
VOC (volatile organic content) = 3.50 lbs/gallon
Equivalent ratio (epoxy/anhydride) = 1.40
% catalyst (on solids) = 2.50%
% UVA (on solids) = 3.00%
% HALS (on solids) = 2.00%
The determined properties were:
Solids = 55.13%
VOC = 3.71 lb/gallon
Viscosity (Zahn #2) = 23.5 seconds
Viscosity (after 2 hours) = 48 seconds (#3 Zahn cup)
Time to tack free = 1.75 hours
Hardness (Persoz) after 1 day = 42
Hardness (Persoz) after 1 week = 67

The appearance of the coating was excellent with high gloss and distinctness of image over the waterborne basecoat system.

EXAMPLE 10

This example illustrates the preparation of a multi-component clearcoat composition without some of the diluents of the last example. The composition was prepared by mixing the following three mixtures just prior to spray application over a water borne basecoat which provides the color required for an automotive refinish coating.

| Components | Parts |
|---|---|
| Anhydride Containing Mixture: | |
| Anhydride polymer | 37.82 |
| (as prepared in Example 7) | |
| Methyl hexahydrophthalic anhydride | 8.65 |
| Tinuvin ™ 1130 UV absorber (Ciba-Geigy) | 3.51 |
| Tinumvin ™ 123 HALS (Ciba-Geigy) | 2.34 |
| Resiflow ™ S (Monsanto) | 0.88 |
| Epoxy Containing Mixture: | |
| Polyepoxide | 96.79 |
| (as prepared in Example 3) | |
| Diglycidyl ester (Ciba-Geigy CY184) | 7.54 |
| Catalyzed Reducer Containing Mixture: | |
| 1,4-Diazabicyclo[2.2.2]octane | 11.70 |
| (25% in butanol) | |
| Solvent blend (70/30 propylene glycol monomethyl ether acetate/hexyl acetate) | 10.81 |
| Methyl ethyl ketone | 19.96 |
| Total | 200.00 |

The theoretical constants for the above composition are as follows:
Solids = 58.51%
VOC = 3.50 lbs/gallon
Equivalent ratio (epoxy/anhydride) = 1.00
% catalyst (on solids) = 2.50%
% UVA (on solids) = 3.00%
% HALS (on solids) = 2.00%
The determined properties were as follows:
Solids = 59.29%
VOC = 3.41 lbs/gallon
Viscosity (Zahn #2) = 32 seconds
Time to tack free = 2.00 hours
Hardness (Persoz) after 1 day = 39
Hardness (Persoz) after 1 week = 90

The appearance of the coating was very good with high gloss and distinctness of image over the waterborne basecoat system.

EXAMPLE 11

This example illustrates the preparation of a multi-component clearcoat with a catalyst/non-aqueous dispersion complex. The composition was prepared by mixing the following three mixtures just prior to spray application over a water borne basecoat which provides the color required for an automotive refinish coating.

| Components | Parts |
|---|---|
| Anhydride Containing Mixture: | |
| Anhydride polymer | 36.62 |
| (as prepared in Example 7) | |
| Methyl hexahydrophthalic anhydride | 8.37 |
| Tinuvin ™ 1130 UV absorber (Ciba-Geigy) | 3.51 |
| Tinuvin ™ 123 HALS (Ciba-Geigy) | 2.34 |
| Resiflow ™ S (Monsanto) | 0.88 |
| Epoxy Containing Mixture: | |
| Polyepoxide | 93.70 |
| (as prepared in Example 3) | |
| Diglycidyl ester (Ciba-Geigy CY184) | 7.30 |
| Catalyzed Reducer Containing Mixture: | |
| 1,4-Diazabicyclo[2.2.2.]octane | 13.65 |
| ("DABCO") (25% in xylene) | |
| Solvent blend (70/30 PM acetate/hexyl acetate) | 10.46 |
| Methyl ethyl ketone | 16.33 |
| NAD/DABCO solution | 6.83 |
| Total | 200.00 |

The solution of an NAD polymer and DABCO (non-aqueous dispersed polymer and 1,4-Diazabicyclo[2.2.2.]octane) was made by mixing 100 parts of dispersed polymer with 4 parts 1,4-diazabicyclo [2.2.2.]octane in 20 parts xylene. The NAD polymer is comprised of 37% of a dispersant comprised of 2-ethylhexyl methacrylate/iso-butyl methacrylate/hydroxyethy methacrylate, in a weight ratio of 40/40/20, and 63% of a core polymer comprised of the following: styrene/methyl methacrylate/methyl acrylate/hydroxyethyl acrylate/methacrylic acid/allyl methacrylate, in a weight ratio of 15/35/18/25/4/3 in an aliphatic/aromatic hydrocarbon medium.

The theoretical constants for the above compostition are as follows:
Solids = 58.58%
VOC = 3.50 lbs/gallon
Equivalent ratio (epoxy/ahnydride) = 1.00
% catalyst (on solids) = 3.10%
% UVA (on solids) = 3.00%
% HALS (on solids) = 2.00%
The determined properties were as follows:
Solids = 57.73%
VOC = 3.50 lbs/gallon
Viscosity (Zahn #2) = 35 seconds
Time to tack free = 0.75 hours
Hardness (Persoz) after 1 day = 57
Hardness (Persoz) after 1 week = 126

The appearance of the coating was very good with high gloss and distinctness of image over the waterborne basecoat system.

COMPARATIVE EXAMPLE 12

This example compares a random structured acrylic polymer, prepared by free radical polymeriation, versus a structured acrylic polymer, prepared by group transfer polymerization according to the present invention. A comparison of two polymers of the same overall structure was made by preparing two clearcoats with the following formulations:

| Components | Sample A Parts | Sample B Parts |
|---|---|---|
| Part I: | | |
| Anhydride polymer (Example 7) | 42.14 | 42.14 |
| Butyl acetate | 15.00 | 15.00 |
| Methyl hexahydrophthalic anhydride | 8.63 | 8.63 |
| Tinuvin TM 1130 UVA | 3.07 | 3.07 |
| Resiflow TM S solution | 0.53 | 0.53 |
| Tinuvin TM 123 HALS | 2.33 | 2.33 |
| Part II: | | |
| Polymer 3 above | 66.35 | — |
| Polymer 4 above | — | 73.11 |
| Araldite TM CY 184 | 10.00 | 10.00 |
| Butyl acetate | 15.80 | 9.05 |
| Part III: | | |
| 25% DABCO in n-butanol | 8.00 | 8.00 |

The comparative properties of the two compositions were as follows:

| | | |
|---|---|---|
| Solids | 58.82% | 58.74% |
| Viscosity (Zahn #2) | 27 sec | 22 sec |
| B-K Dry Time | | |
| 1st transition | 2.9 hours | 8.75 hours |
| 2nd transition | 7.6 hours | 18.5 hours |
| Persoz hardness | | |
| 1 day | 39 | 28 |
| 7 day | 113 | 102 |

As evident from the above data, sample A exhibited a much faster cure and shorter dry time, based on the structurally designed polymer according to the present invention.

EXAMPLE 13

This example illustrates the preparation of a pigmented coating composition, according to the present invention, for ambient temperature cure. The composition comprises a DABCO/dimethylethanolamine (DMEA) catalyst and a lower molecular weight resin. The composition was prepared by thoroughly blending together the following constituents:

| Component | Parts |
|---|---|
| Anhydride Containing Mixture: | |
| Anhydride polymer (as prepared in Ex. 7) | 188.4 |
| Butyl acetate | 11.6 |
| Epoxy Containing Mixture: | |
| Epoxy resin (as prepared in Ex. 3) | 12.0 |
| Araldite TM CY-184 (Diglycidyl Ester, Ciba-Geigy) | 18.4 |
| Araldite TM DY-025 (Glycidyl Ether, Ciba-Geigy) | 7.4 |
| Denecol TM EX-622 (Sorbitol Epoxy, Nagase) | 16.2 |
| White tint (dispersion) | 124.8 |
| Cab-O-Sil TM dispersion (silica sag controller) | 26.2 |
| Silicone (VH-5379) | 0.7 |
| Catalyst Containing Mixture: | |
| 1,4 Diazabicyclo[2.2.2]octane (DABCO) | 5.3 |
| Dimethyl ethanol amine (DMEA) | 5.3 |
| Ethanol | 35.6 |
| Butyl acetate | 20.0 |
| Tinuvin TM 1130 (UV absorber, Ciba-Geigy) | 3.8 |
| Total | 475.7 |

EXAMPLE 14

This example illustrates the preparation of a pigmented coating composition, according to the present invention, for ambient temperature curing. The composition comprises a DABCO/DMEA catalyst system and a higher molecular weight epoxy resin. The coating composition was prepared by thoroughly blending together the following constituents:

| Component | Parts |
|---|---|
| Anhydride Containing Mixture: | |
| Anhydride polymer (as prepared in Ex. 7) | 188.4 |
| Butyl acetate | 11.6 |
| Epoxy Containing Mixture: | |
| Epoxy resin (as prepared in Example 2) | 62.7 |
| Araldite TM CY-184 (diglycidyl ether, Ciba-Geigy) | 19.9 |
| White tint (dispersion) | 140.0 |
| Cab-O-Sil TM dispersion (silica sag controller) | 13.1 |
| FC-430 (fluoro-oligomer surfactant, 3M Company) | 0.1 |
| Catalyst Containing Mixture: | |
| 1,4 Diazabicyclo[2.2.2.]octane (DABCO) | 2.6 |
| Dimethyl ethanol amine (DMEA) | 2.6 |
| Tinuvin TM 1130 (UV absorber, Ciba-Geigy) | 2.0 |
| Ethanol | 35.8 |
| Butanol | 3.7 |
| Butyl cellosolve | 23.3 |
| Total | 505.8 |

The resulting coating composition was sprayed onto primed metal panels. The composition cured at ambient temperature and provided a film which was hard, glossy and durable.

EXAMPLE 15

This example illustrates the preparation of a pigmented coating composition, according to the present invention, for ambient temperature curing. The composition comprises a 1-n-propyl-3-methylimidazole-2-thione (PTI) catalyst system and a lower molecular weight epoxy resin. The coating composition was prepared by thoroughly blending together the following constituents:

| Components | Parts |
|---|---|
| Anhydride Containing Composition: | |
| Anhydride polymer (as prepared in Ex. 7) | 188.4 |
| Butyl acetate | 11.6 |
| Epoxy Containing Composition: | |
| Epoxy resin (as prepared in Ex. 3) | 70.0 |
| Araldite TM CY-184 (diglycidyl ester, Ciba-Geigy) | 22.0 |
| White tint (dispersion) | 155.0 |
| Cab-O-Sil dispersion (silica sag control agent) | 13.1 |
| Silicone (VH-5379) | 0.7 |
| Catalyst Containing Mixture: | |
| 1-n-propyl-3-methylimidazole-2-thione (PTI, PolyOrganix) | 12.8 |
| Tinuvin TM 1130 (UV absorber, Ciba-Geigy) | 2.0 |
| Ethanol | 31.2 |
| Butanol | 3.7 |
| Butyl cellosolve | 20.3 |
| Total | 530.8 |

The resulting coating composition was sprayed onto primed metal panels. The composition cured at ambient temperature and provided a film which was hard, glossy and durable.

EXAMPLE 16

This example illustrates the preparation of a pigmented coating, according to the present invention, for ambient temperature curing. The composition comprises a propyl thione imidazole catalyst system and a higher molecular weight epoxy resin. The composition was prepared by thoroughly blending together the following mixtures:

| Components | Parts |
| --- | --- |
| Anhydride Containing Mixture: | |
| Anhydride polymer (as prepared in Ex. 7) | 187.4 |
| Butyl acetate | 11.6 |
| Epoxy Containing Mixture: | |
| Epoxy resin (as prepared in Ex. 2) | 42.0 |
| Araldite TM CY-184 (epoxy resin, Ciba-Geigy) | 27.2 |
| White tint (dispersion) | 140.0 |
| Cab-O-Sil dispersion (silica sag control agent) | 13.1 |
| FC-430 (fluoro-oligomer surfactant, 3M Company) | 0.1 |
| Catalyst Containing Mixture: | |
| 1-n-propyl-3-methylimidazole-2-thione (Catalyst from PolyOrganix) | 11.7 |
| Tinuvin TM 1130 (UV absorber, Ciba-Geigy) | 2.0 |
| Ethanol | 31.9 |
| Butanol | 3.7 |
| Butyl cellosolve | 20.7 |
| Total | 492.4 |

The resulting coating composition was sprayed onto primed metal panels. The composition cured at ambient temperature and provided a film which was hard, glossy and durable.

EXAMPLE 17

This example illustrates a low volatile organic content (VOC) single stage pigmented enamel including a propyl thione imidazole catalyst system and a higher molecular weight epoxy resin. The coating composition was prepared by thoroughly blending together the following constituents:

| Components | Parts |
| --- | --- |
| Anhydride Containing Mixture: | |
| Anhydride polymer (as prepared in Example 7) | 1647.0 |
| Methyl ethyl ketone | 110.4 |
| Epoxy Containing Mixture: | |
| Epoxy resin (as prepared in Example 2) | 367.8 |
| Araldite TM CY-184 (epoxy resin, Ciba-Geigy) | 237.8 |
| White tint (dispersion) | 769.3 |
| Black tint (dispersion) | 33.2 |
| Indo-blue tint (dispersion) | 26.2 |
| Blue tint (dispersion) | 23.3 |
| Blue tint (dispersion) | 21.8 |
| Cab-O-Sil dispersion (silica sag control agent) | 114.4 |
| FC-430 (fluoro-oligomer surfactant from 3M Company) | 0.2 |
| Isobutanol | 83.4 |
| Isopropanol | 207.8 |
| Butyl cellosolve | 162.2 |
| Catalyst Containing Mixture: | |
| 1-n-propyl-3-methylimidazole-2-thione (catalyst) | 02.5 |
| Tinuvin TM 123 (hindered amine light stabilizer from Ciba-Geigy) | 18.4 |
| Tinuvin TM 292 (UV Screener from Ciba-Geigy) | 18.4 |
| Polyvinyl pyrrolidone (bridging Solution) | 11.3 |
| Isopropanol | 112.2 |
| Total | 4067.1 |

The resulting coating composition was sprayed onto primed metal panels. The composition cured at ambient temperature and provided a film which was hard, glossy and durable.

COMPARATIVE EXAMPLE 18

This example compares various medium volatile organic content clearcoat compositions. The compositions were prepared by mixing the following portions:

| | A Parts | B Parts | C Parts |
| --- | --- | --- | --- |
| Portion 1 | | | |
| GMA acrylic copolymer A | 11.12 | — | — |
| GMA acrylic copolymer B | — | 12.2 | — |
| GMA acrylic copolymer C | — | — | 12.2 |
| Sorbitol glycidyl ether | 3.58 | 3.58 | 3.58 |
| (GMA is glycidyl methacrylate.) | | | |
| Part 2 | | | |
| Itaconic anhydride copolymer (prepared in 7) | 23.61 | 23.03 | 23.03 |
| Propylene glycol monomethyl ether acetate | 14.25 | 13.75 | 13.75 |
| Part 3 | | | |
| Non-aqueous dispersion | 11.72 | 11.72 | 11.72 |
| Acrylic polyol | 6.39 | 6.39 | 6.39 |
| Isopropanol | 12.40 | 12.40 | 12.40 |
| 10% Dabco solution | 7.16 | 7.16 | 7.16 |
| 30% Tinuvin ® 328 solution | 2.38 | 2.38 | 2.38 |
| 10% Tinuvin ® 144 solution | 7.16 | 7.16 | 7.16 |
| Flow agent (KP306) | 0.23 | 0.23 | 0.23 |

In the above compositions, GMA acrylic copolymer A is, similar to Example 5 above, prepared from glycidyl methacrylate and butyl methacrylate in the weight ratio of 60/40. Polymerization is by free radical polymerization in aromatic hydrocarbon solvents as described in Example 5 above. GMA acrylic copolymer B is, similar to Example 3 above, prepared from a mixture of glycidyl methacrylate, methyl methacrylate and hydroxyethyl methacrylate in the ratio of 5/5/1. Polymerization is by group transfer polymerization similar to that described in Example 3 above. GMA acrylic copolymer C is made from a mixture of glycidyl methacrylate, isobutyl methacrylate, and hydroxyethyl methacrylate in the ratio of 5/5/1. Polymerization is by group transfer polymerization as described in example 3 above.

The non-aqueous dispersion polymer is comprised of a core, 65% by weight thereof, comprising styrene, methylmethacrylate, methacrylate, hydroxyethyl acrylate, glycidyl methacrylate and allyl methacrylate in the ratio of 15/36.5/18/25/4/1.4. The non-core component of the dispersion polymer, 35% by weight thereof, is comprised of isobutyl methacrylate, hydroxyethyl methacrylate, and ethylhexyl methacrylate in the ratio of 40/20/40. The acrylic polyol is prepared as in example 6 above and comprises styrene, ethyl methacrylate, and hydroxyethyl acrylate in the ratio of 20/25/25/30. The properties of the three compositions as described above are as follows:

| RESIN | A | B | C |
| --- | --- | --- | --- |
| Gel times | 16 hrs | 16 hrs | 19 hrs |
| Initial | 17 | 16.5 | 17 |
| Viscosity | 21.2 (3 hrs) | 21.4 (3 hrs) | 19.9 (3 hrs) |
| Swelling ratio | 1.44 (1 day) | 1.43 (1 day) | 1.24 (1 day) |
| Air dry | 1.73 (8 day) | | 1.74 (8 day) |
| Bake (30' × 140° F.) | 1.39 | | 1.30 |

-continued

| RESIN | A | B | C |
|---|---|---|---|
| Hardness | | | |
| Persoz 1 DAY | 77 | 94 | 80 |
| Persoz 7 DAY | 176 | 202 | 186 |
| Tukon 1 DAY | 1.69 | 3.26 | 1.98 |
| Tukon 7 DAY | 5.52 | 6.62 | 5.58 |
| Distinctness of image | 65 | 60 | 70 |
| Mandrel bend | 4" (fine cracks) | | ⅛" (very fine cracks) |
| Impact (lbs) | 10 | | 12 |

The above data shows that copolymer C, which is essentially the same hardness of copolymer A, has greater flexibility according to the mandrel bend test. Copolymer B has a higher hardness than copolymer A.

Various modifications, alterations, additions, or substitutions of the components of the composition and process of this invention will be apparent to those skilled in the art without departing from the scope and spirit of this invention and it should be understood that this invention is not unduly limited to the illustrative embodiments set forth herein.

We claim:

1. A coating composition comprising a binder in 20–80% by weight of an organic liquid carrier and about 0.1–5% by weight, based on the weight of the binder, of a curing catalyst, wherein the binder comprises the following:
   (a) 25–90% by weight, based on the weight of the binder, of an anhydride functional polymer having at least two reactive anhydride groups and having a weight average molecular weight of about 2,000–50,000; and
   (b) 5–50% by weight, based on the weight of the binder, of an epoxy functional polymer having at least two reactive epoxy groups, wherein the epoxy functional polymer is structured as a product of group transfer polymerization, so that the epoxy groups are skewed to have a majority of the epoxy groups at one end of the polymer, which end was first formed during said group transfer polymerization.

2. The composition of claim 1, wherein the anhydride functional polymer is an acrylic polymer comprising polymerized monomers of an ethylenically unsaturated anhydride and polymerized monomers selected from the group consisting of alkyl methacrylate, alkyl acrylate and any mixtures thereof, wherein the alkyl groups have 1–8 carbon atoms.

3. The composition of claim 1, wherein the epoxy functional polymer is glycidyl functional.

4. The coating composition of claim 2, in which the anhydride acrylic polymer contains about 0.1–50% by weight of monomers selected from the group consisting of styrene, acrylonitrile, methacrylonitrile and any mixtures thereof.

5. The coating composition of claim 4, in which the anhydride acrylic polymer has a glass transition temperature of 0° to 75° C. and a weight average molecular weight of about 3,000–25,000.

6. The coating composition of claim 2, in which the anhydride acrylic polymer comprises 20–40% by weight, based on the weight of the acrylic polymer, of methyl methacrylate, styrene or a mixture of methyl methacrylate and styrene, 35–55% by weight of an alkyl methacrylate or an alkyl acrylate having 2–4 carbon atoms in the alkyl group, and 5–55% by weight of ethylenically unsaturated anhydride polymerized monomers.

7. The coating composition of claim 1, wherein the epoxy functional component comprises hydroxyalkyl alkyacrylate, alkyl methylacrylate, and glycidyl methacrylate polmerized monomers, wherein the alkyl groups have 1 to 12 carbon atoms.

8. The coating composition of claim 1, wherein the curing catalyst for the composition is selected from the group consisting of a triethylene diamine, imidazole thione, dimethyl ethanolamine, and combinations thereof.

9. The coating composition of claim 1, wherein the composition further comprises a pigment.

10. The coating composition of claim 1, wherein the group transfer polymerization is initiated by 1-(2-trimethylsiloxy)ethoxy-1-trimethylsiloxy-2-methyl propene.

11. The coating composition of claim 2 in which the anhydride functional polymer comprises polymerized monomers of butyl methacrylate, butyl acrylate, styrene, and itaconic anhydride.

12. The coating composition of claim 2 in which the anhydride functional polymer consists of polymerized monomers of butyl methacrylate, butyl acrylate, styrene, and maleic anhydride.

13. The coating composition of claim 1, wherein the epoxy functional polymer comprises monomers of butyl methacrylate and glycidyl methacrylate.

14. The coating composition of claim 1 containing about 0.1–200% by weight, based on the weight of the binder, of pigment.

15. The substrate coated with a layer of a waterborne basecoat and a clearcoat of the composition of claim 1, wherein the basecoat and clearcoat are cured at ambient or elevated temperatures.

16. A substrate coated with a layer of solvent borne melamine crosslinked basecoat and a clearcoat of the composition of claim 1, wherein the basecoat and clearcoat are cured at elevated temperatures.

17. A substrate coated with a layer of a solvent borne lacquer basecoat and a clear coat of the composition of claim 1, wherein the basecoat and clearcoat are cured at ambient temperatures.

* * * * *